Oct. 9, 1962 R. E. BECKER 3,057,237
ADJUSTABLE CENTER FOR CHUCK
Filed Nov. 27, 1957 2 Sheets-Sheet 1

INVENTOR.
ROBERT E. BECKER,
BY
Parker and Carter
ATTORNEYS.

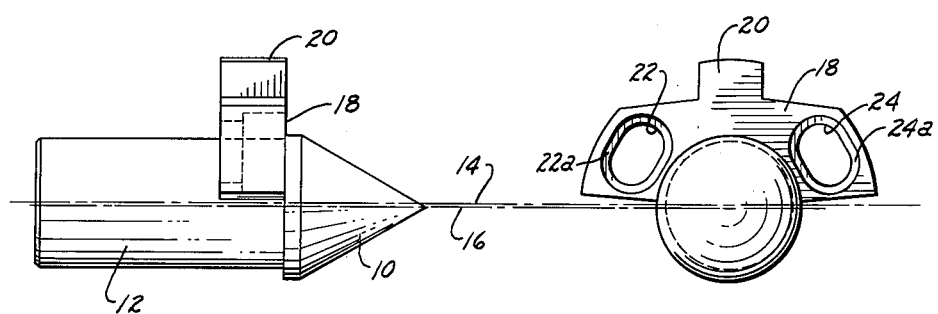
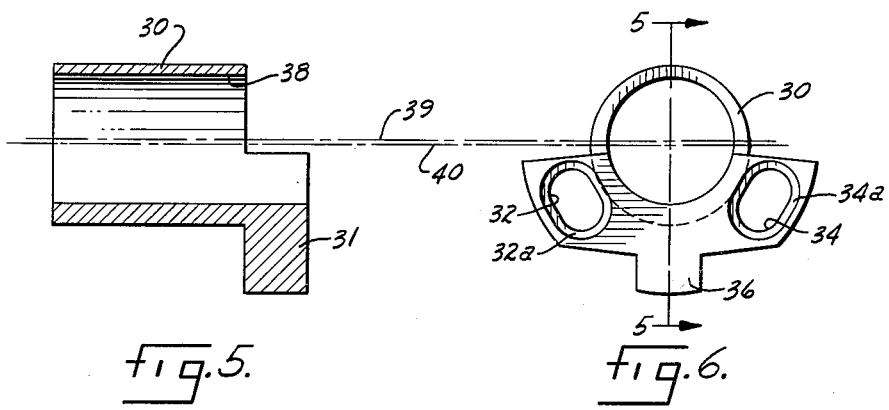

United States Patent Office 3,057,237
Patented Oct. 9, 1962

3,057,237
ADJUSTABLE CENTER FOR CHUCK
Robert E. Becker, Logansport, Ind., assignor to Logansport Machine Company, Logansport, Ind., a corporation of Indiana
Filed Nov. 27, 1957, Ser. No. 699,377
2 Claims. (Cl. 82—33)

My invention relates to an apparatus for accurately positioning the workholding structure of machine tools with respect to the axis of rotation of the housing or supporting structure in which the workholder is carried. More specifically it is concerned with the problem of adjusting a chuck center insert with respect to the spindle of the machine upon which the center insert carrying chuck is mounted.

Accordingly, a primary object of my invention is to provide an apparatus for quickly and accurately positioning the chuck center insert on a machine such as a lathe, in order to bring the point of the insert exactly concentric with the spindle upon which the chuck is mounted.

Another object is to provide a center insert and a center insert bushing rotatable with respect to one another and to the chuck in which they are held in order to bring the axis of the cone of the insert into proper alignment.

Another object is to attain the proper alignment of the center insert with the spindle of the machine by use of a double eccentric formed by the insert and insert bushing.

A further object is to provide an arrangement for making the eccentric adjustment using conventional fastener means adapted to adjust and secure the center insert with respect to the chuck.

Other objects will become apparent throughout the course of the following specification.

My invention is illustrated more or less diagrammatically in the accompanying figures wherein, FIGURE 1 is a front view of an adjustable center for a compensating chuck showing the parts in assembled relationship with the adjusting and securing means partly in phantom, and the cover plate removed;

FIGURE 3 is an elevation of a center insert adapted for connection with the adjustable center shown in FIGURE 1;

FIGURE 4 is a front end view of the center insert shown in FIGURE 3;

FIGURE 5 is a section taken along the line 5—5 in FIGURE 6; and

FIGURE 6 is a front end view of a center insert bushing adapted to receive the center insert of FIGURE 3.

Like reference numerals will be used to indicate like parts throughout the several views of the drawing.

Figure 1:
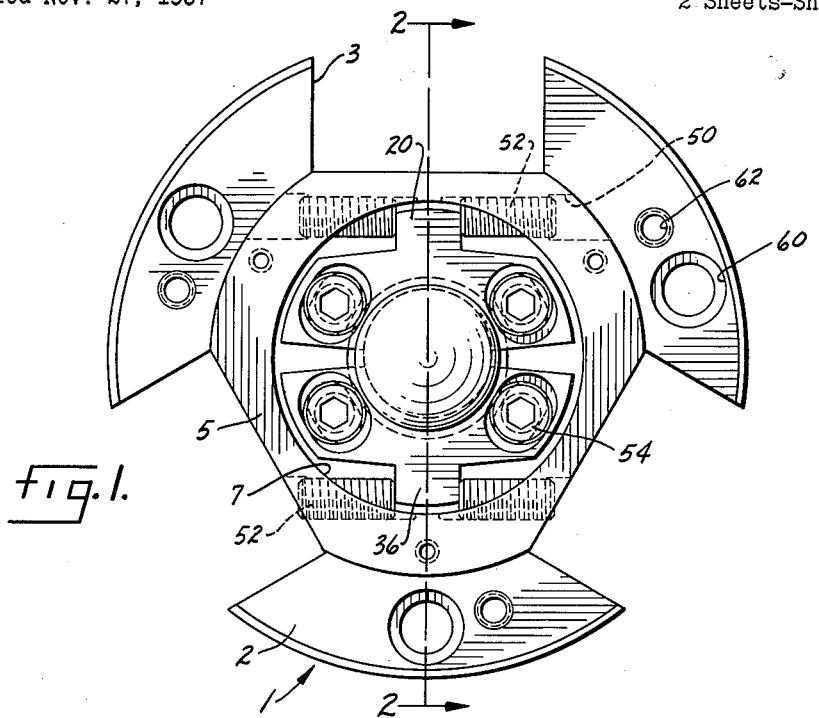
Figure 2:
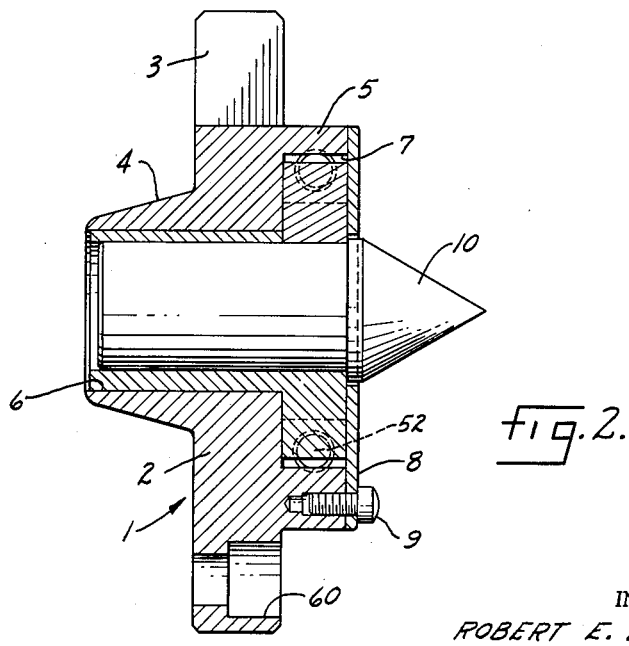
FIGURE 2 is a view taken along line 2—2 of FIGURE 1.

Referring now particularly to FIGURES 1 and 2, I have shown an assembled adjustable center capable of being mounted (in this instance) on a three-jaw compensating chuck. It will be understood that may invention is not to be limited to any particular number of jaws for the following specification and drawings are intended to be of an illustrative nature only.

The center is indicated generally at 1 and is composed of a center plate 2 having recesses 3 for engagement with any suitable chuck, and a projecting annular flange 5 of varying thickness. The center plate 2 and tapered portion 4 have a bore 6. The annular flange 5 in conjunction with the flat outer mid-face of the center plate forms a circular recess 7.

Referring now to FIGURE 3, I have shown a center insert having a cone 10 terminating in a point and a main body portion or shank 12. The cone portion of the insert and the shank may be integrally formed but are eccentrically disposed with respect to one another. That is, the axis 14 of the shank 12 is off-set with respect to the axis 16 of the cone 10. At 18 I have indicated an upstanding collar extending a little less than 180° around the circumference of the shank, having a projection or adjusting arm 20 and holes 22 and 24 which may be suitably recessed as at 22a and 24a.

Referring now to FIGURE 5, there is shown a center insert bushing having a cylindrical portion 30 and a projecting collar 31 for all purposes identical to the projecting collar 18 of the center insert. Suitable holes 32 and 34 are provided in the wings of the collar with recesses 32a and 34a and a projection or adjusting arm 36. The cylindrical sleeve member 30 forms a bore 38 whose center line 39 is eccentrically displaced with respect to the center line 40 of the sleeve itself. The bore 38 is of a diameter sufficient to receive the shank 12 of the center insert preferably in a tight-fitting relationship. The center insert bushing is formed of a diameter sufficient to be telescopically and closely received within the bore 6 of the center support bushing.

Referring again to FIGURE 1, I have shown adjusting means for positioning the center insert and center bushing at any desired location. The adjustable center which in effect is a center supporting structure, is shown as having a series of four transverse bores 50 shown drilled in the annular upstanding flange 5. Disposed within the bores 50 are a series of, in this instance four, adjustable positioning means such as screws 52 adapted to be positioned by a conventional Allen head wrench and impinging upon projections 20 and 36 of the center insert and center insert bushing, respectively. Disposed in the holes 22, 24, 32 and 34 of the insert and insert bushing are lock screws 54 which secure the insert and insert bushing to the center plate, as most clearly shown in FIGURE 1.

At 8 I have indicated an annular cover plate formed with chordal sections removed, as best seen in FIGURE 1, to provide rectangular recesses 3 which may be slipped over suitable chuck jaws. The cover plate is bolted to flange 5 by fasteners 9.

At 60 I have indicated any suitable connecting means for connecting the adjustable center to a compensating chuck.

The use and operation of my device is as follows.

It frequently happens that the center insert on lathes or similar machine tools frequently becomes misaligned with respect to the spindle of the machine in which the center is carried. While it may be possible to adjust the entire chuck to some degree and even further to adjust the center plate that carries the center insert, it is quite difficult to attain a fine degree of adjustment. The movement of relatively large parts is involved and the force requirement is correspondingly large.

By the use of my invention I am able to precisely align the cone point of the center insert with respect to the spindle of the machine by manipulation of the center itself independently of its mounting; that is, independently of the center plate or chuck in which it is mounted. A very fine degree of precision control can be maintained and only a modest amount of force is required in order to make the adjustments.

Referring now to FIGURES 3 through 6, it will be seen that the center insert itself of FIGURE 3 is formed with a shank portion 12 of a diameter sufficient to be received within the bore 38 of the center insert bushing shown in FIGURE 5. These two parts are assembled and the assembly slipped into the bore 6 of the center plate 1 as shown in FIGURE 2. It will be understood that the mating surfaces will be very accurately machined, preferably on the order of 3 to 5 ten/thousandths of an inch. To attain these tolerances two operations may have to be performed, either a turning or a boring operation and a final finish grind operation.

After the center insert with its bushing is slipped into the center plate, the adjusting screws 52 are threaded into their bores 50 and screw into engagement with projections 36 and 20. The cone point is brought into alignment with the axis of the spindle of the machine by movement of the center insert or its bushing or both by manipulation of the projections. When the cone point is in alignment with the spindle, the lock screws 54 are inserted in the bores 32, 34 and 22, 24 in the lower and upper collars respectively, and the center and its bushing are thereby secured to the center plate. The cover plate 8 is then placed over the entire assembly and secured by bolts 9.

It will be observed that the external ends of the bores 50 are larger in diameter than the threaded end to permit insertion and withdrawal of the bolts in an expeditious and easy manner.

The collars, which overlap along the longitudinal axis of the cyclindrical sleeve member as best seen in FIGURE 2, do not extend completely around either the center insert or its bushing. Thus, when they are in assembled relationship as shown in FIGURE 1, ample clearance will be provided to permit rotation of the collars toward one another in order to bring the cone point into alignment. In other words, the total of the two sectors defined by edges of the collars or the radial sweep of the collars is less than 360°.

The double eccentric principle is extremely flexible and permits an infinite variety of positions. It also makes possible a very fine control over the positioning of the point. The adjusting screws 52 are primarily adjusting means, but they also act in some degree as securing members. The main clamping or securing force is supplied by the lock screws 54, however.

It will be understood that many changes may be made in the size, shape and disposition of parts without departing from the essential spirit of my invention. For example, it may be entirely possible to eliminate the center insert bushing, but then only a single eccentric effect would be produced. Similarly, other means such as wedges could be used to position the center and its bushing.

Accordingly, I intend the above description of my invention to be taken as illustrative only, and I do not wish to be limited except by the scope of the following appended claims.

I claim:

1. An insertable and removable center, said center being radially adjustable in small increments in all directions with respect to the axis of a center holder such as a chuck, said adjustable center including, in combination,
   a center insert, said center insert having
   a shank terminating in
   a cone, the longitudinal axis of the shank being parallel to and offset from the altitude of the cone,
   a bushing, said bushing having a bore therein of a size sufficient to snugly receive the shank, the axis of the bore being offset with respect to the axis of the periphery of the bushing,
   a first adjusting arm carried by the center insert, said first adjusting arm extending generally radially outwardly from the shank and adapted to rotate the center insert about the axis of the shank when an adjusting force is applied against said first adjusting arm to thereby rotate the apex of the cone about the axis of the shank,
   a second adjusting arm carried by the bushing, said second adjusting arm extending generally radially outwardly from the bushing and adapted to rotate the bushing about the center insert when an adjusting force is applied against said second adjusting arm, said center insert and bushing being rotatable, by means of their respective adjusting arms, together or relative to one another to thereby provide an infinite combination of adjustments for aligning the center insert with a predetermined axis,
   a collar carried by the center insert and extending generally radially outwardly therefrom, said collar being apertured to receive clamping screws for securing the center insert to the work holder once the center insert is properly aligned and
   a bushing collar, said bushing collar being apertured to receive clamping screws for securing the center insert to the work holder once the center insert is properly aligned, said collars being generally aligned with one another in a vertical plane, the radial sweep of each collar being substantially less than 180 degrees so as to avoid interference with one another as the center insert and bushing are rotated with respect to one another.

2. An insertable and removable center, said center being radially adjustable in small increments in all directions with respect to the axis of a center holder such as a chuck, said adjustable center including in combination,
   a center insert, said center insert having
   a shank terminating in
   a cone, the longitudinal axis of the shank being parallel to and offset from the altitude of the cone,
   a bushing, said bushing having a bore therein of a size sufficient to snugly receive the shank, the axis of the bore being offset with respect to the axis of the periphery of the bushing,
   a first adjusting arm carried by the center insert, said first adjusting arm extending generally radially outwardly from the shank and adapted to rotate the center insert about the axis of the shank when an adjusting force is applied against said first adjusting arm to thereby rotate the apex of the cone about the axis of the shank, said longitudinal axis of the shank being upwardly offset with respect to the altitude of the cone and lying between the first adjusting arm and the altitude of the cone,
   a second adjusting arm carried by the bushing, said second adjusting arm extending generally radially outwardly from the bushing and adapted to rotate the bushing about the center insert when an adjusting force is applied against said second adjusting arm, said bushing periphery axis being downwardly offset with respect to the bore axis and lying between the second adjusting arm and the bore axis, said first and second adjusting arms being disposed substantially 180 degrees with respect to one another, said center insert and bushing being rotatable, by means of their respective adjusting arms, together or relative to one another to thereby provide an infinite combination of adjustments for aligning the center insert with a predetermined axis, and means carried by the center and cooperable with the center holder for securing the center to the center holder to thereby prevent longitudinal displacement of the center with respect to the center holder.

(References on following page)

References Cited in the file of this patent

UNITED STATES PATENTS

| | | |
|---|---|---|
| 825,428 | Spencer | July 10, 1906 |
| 1,157,817 | Steudner | Oct. 26, 1915 |
| 1,222,178 | Browand | Apr. 10, 1917 |
| 1,565,264 | Dubi | Dec. 15, 1925 |
| 2,368,736 | Wyrick | Feb. 6, 1945 |
| 2,456,776 | Faust | Dec. 21, 1948 |
| 2,524,852 | Strauss | Oct. 10, 1950 |
| 2,547,858 | Dearborn | Apr. 3, 1951 |
| 2,706,872 | Flanders et al. | Apr. 26, 1955 |
| 2,711,935 | Miles | June 28, 1955 |
| 2,860,538 | Bruet | Nov. 18, 1958 |

FOREIGN PATENTS

| | | |
|---|---|---|
| 608,873 | Canada | Nov. 15, 1960 |
| 915,404 | Germany | June 10, 1954 |
| 1,052,332 | France | Sept. 23, 1953 |

OTHER REFERENCES

Publication, American Machinist, vol. 42, No. 15, page 646, Apr. 15, 1915; article on "Adjustable Lathe Center," by Geo. C. Lawrence.

German Patent, H 22,784 Ib/49a, Aug. 30, 1956.